(12) United States Patent
Park et al.

(10) Patent No.: US 10,495,921 B2
(45) Date of Patent: Dec. 3, 2019

(54) FLEXIBLE LIQUID CRYSTAL LENS

(71) Applicant: Kyungpook National University Industry-Academic Cooperation Foundation, Daegu (KR)

(72) Inventors: Jonghoo Park, Daegu-si (KR); Jin Hyuk Bae, Daegu-si (KR); Jihoon Jung, Daegu-si (KR); Daekyeong Kang, Daegu-si (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 55 days.

(21) Appl. No.: 15/787,082

(22) Filed: Oct. 18, 2017

(65) Prior Publication Data

US 2018/0107056 A1 Apr. 19, 2018

(30) Foreign Application Priority Data

Oct. 19, 2016 (KR) ........................ 10-2016-0135517
Aug. 2, 2017 (KR) ........................ 10-2017-0098141

(51) Int. Cl.
*G02F 1/1335* (2006.01)
*G02F 1/1343* (2006.01)
(Continued)

(52) U.S. Cl.
CPC ......... *G02F 1/133526* (2013.01); *G02B 3/14* (2013.01); *G02F 1/1339* (2013.01); *G02F 1/1343* (2013.01); *G02F 1/133345* (2013.01)

(58) Field of Classification Search
CPC ............. G02F 1/133526; G02F 1/1343; G02F 1/1339; G02F 1/133345; G02B 3/14
(Continued)

(56) References Cited

U.S. PATENT DOCUMENTS 5,583,678 A * 12/1996 Nishino .............. G02F 1/13363
345/95
5,917,562 A * 6/1999 Woodgate .............. G02B 27/26
349/15
(Continued)

FOREIGN PATENT DOCUMENTS

JP 2014182330 A 9/2014
KR 1020070065317 6/2007
(Continued)

OTHER PUBLICATIONS

Guoqiang Li et al., Switchable electro-optic diffractive lens with highefficiency for ophthalmic applications, 2006, pp. 6100-6104, vol. 103, No. 16, PNAS.
(Continued)

*Primary Examiner* — Hoan C Nguyen
(74) *Attorney, Agent, or Firm* — Cantor Colburn LLP

(57) ABSTRACT

A flexible liquid crystal Fresnel lens is provided that may realize a lens using a polymer thin film substrate, so that it may provide the same electro-optical characteristics irrespective of polarization of light incident on a lens, and provide flexible characteristics and high image quality. The flexible liquid crystal Fresnel lens includes a liquid crystal layer formed between an upper substrate and a lower substrate in which a Fresnel region pattern is formed, wherein the lower substrate and the upper substrate may respectively include a first substrate and a second substrate including a transparent and flexible material while having a birefringent index, optical axes of the lower substrate and the upper substrate may be perpendicular to each other, and optical axes respectively forming an angle of 45° with respect to the lower substrate and the upper substrate may be formed in the liquid crystal layer.

16 Claims, 11 Drawing Sheets

(51) Int. Cl.
  *G02F 1/1333* (2006.01)
  *G02F 1/1339* (2006.01)
  *G02B 3/14* (2006.01)

(58) Field of Classification Search
  USPC .......................................................... 349/200
  See application file for complete search history.

(56) References Cited

U.S. PATENT DOCUMENTS

| | | | | |
|---|---|---|---|---|
| 6,038,001 | A * | 3/2000 | Ono | G02F 1/1391 |
| | | | | 345/89 |
| 6,625,102 | B1 * | 9/2003 | Hashimoto | G02B 27/28 |
| | | | | 369/110.02 |
| 6,721,023 | B1 * | 4/2004 | Weiss | G02B 27/2278 |
| | | | | 348/E13.005 |
| 2015/0219970 | A1 * | 8/2015 | Liu | G02F 1/29 |
| | | | | 349/12 |
| 2015/0346560 | A1 * | 12/2015 | Song | G02F 1/1345 |
| | | | | 349/15 |
| 2016/0011427 | A1 * | 1/2016 | Lin | G02F 1/29 |
| | | | | 349/15 |
| 2017/0010517 | A1 * | 1/2017 | Lin | G02F 1/29 |

FOREIGN PATENT DOCUMENTS

| | | |
|---|---|---|
| KR | 20070118594 A | 12/2007 |
| KR | 100976396 | 8/2010 |
| KR | 1020120124344 A | 11/2012 |
| KR | 1020130094680 | 8/2013 |
| WO | 2006078806 A2 | 7/2006 |
| WO | 2014049577 A1 | 4/2014 |

OTHER PUBLICATIONS

Paul V. Johnson et al., Dynamic lens and monovision 3D displays toimprove viewer comfort, pp. 1-19, UC Berkeley—UCSF Grduate Program in Bioengineering, Berkeley, CA.

Richard H. Y. So et al., Benefits of Matching Accommodative Demands to Vergence Demands in a Binocular Head-Mounted Display: A Study on Stereo Fusion Times, 2011, pp. 545-558, vol. 20, No. 6, Presence, Massachusetts Institute of Technology.

Robert Konrad et al., Novel Optical Configurations for Virtual Reality: Evaluating User Preference and Performance with Focus-tunable and Monovision Near-eye Displays, 2016, pp. 1211-1220, Augmented AR and VR Experiences.

* cited by examiner

FLEXIBLE LIQUID CRYSTAL LENS

CROSS-REFERENCE TO RELATED APPLICATION

This application claims priority to and the benefit of Korean Patent Applications No. 10-2016-0135517 and 10-2017-0098141 respectively filed in the Korean Intellectual Property Office on Oct. 19, 2016 and Aug. 2, 2017, the entire contents of which are incorporated herein by reference.

BACKGROUND

(a) Technical Field

The present invention relates to a liquid crystal Fresnel lens, and more particularly, to a flexible liquid crystal Fresnel lens that may realize a lens using a polymer thin film substrate, so that the same electro-optical characteristic irrespective of polarization of light incident on a lens may be provided, and a flexible characteristic and high image quality may be provided.

(b) Description of the Related Art

More than 60% of the modern population requires vision correction such as through wearing of eyeglasses or contact lenses, or ophthalmologic surgery, and a large population of the aged requires vision correction for presbyopia.

As lenses for vision correction for presbyopia, progressive lenses, which provide a smooth and clear view from near to far, have been widely used. However, the progressive lenses, until the wearer thereof has adapted thereto, dizziness, headaches, eye pain, and eye fatigue may occur, and it is possible to misstep while climbing up or down stairs. Particularly, in a case of a misstep while climbing up and down stairs, elderly people wearing the progressive lenses frequently incur fractures, and may die from various complications due to the fractures.

Recently, various studies have been in progress to utilize a lens which is based on liquid crystal and of which a focal length is electrically varied as a spectacle lens. The liquid crystal has different refractive indexes depending on orientation thereof, and since the orientation of the liquid crystal may be changed by applying an electric field thereto, the liquid crystal is applied to various optical systems. Thus, various electrode patterns for applying an electric field to the liquid crystal have been studied. For example, by individually applying an electric field to a Fresnel region pattern electrode using near-field diffraction by a Fresnel region pattern as an operating principle, a phase thereof is changed so that light passing through a lens undergoes perfect constructive interference at a focal point, thereby providing high diffraction efficiency.

However, a liquid crystal Fresnel lens applied to the spectacle lens electro-optically reacts only to one of two orthogonal polarization components of light. Therefore, the liquid crystal Fresnel lens does not electro-optically react to the two orthogonal polarization components of polarized light such as natural light, or randomly polarized light. That is, since the above-mentioned liquid crystal Fresnel lens is polarization-dependent, two lenses must be sequentially stacked in order to realize a lens independent of polarization.

However, since a conventional liquid crystal Fresnel lens is manufactured on a rigid glass substrate, a thickness thereof is large, and it is heavy, so that its usability is limited. Particularly, when two lenses are stacked in order to realize a lens independent of polarization, its usability is further limited.

In addition, in the conventional liquid crystal Fresnel lens using the glass substrate, since the glass substrate is easily broken during a lens process, a process environment should be carefully prepared, and since it is not easily adhered to the spectacle lens, it is somewhat difficult to apply to an actual product. Particularly, when the conventional liquid crystal Fresnel lens is used in combination with a spherical lens, an additional structural coupling member may be additionally required.

PRIOR ART DOCUMENT

Patent Document (Patent Document 0001) 1. Korean Patent Laid-Open Publication No. 2015-0070784 (Title: LIQUID CRYSTAL FRESNEL LENS AND MANUFACTURING METHOD THEREOF)

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a flexible liquid crystal Fresnel lens that may electrically vary a focal length thereof independently of polarization with a single element by arranging an optical axis of a polymer thin film substrate and an optical axis of a liquid crystal at a predetermined angle.

In addition, the present invention has been made in an effort to provide a flexible liquid crystal Fresnel lens that is ultra-light and flexible by disposing liquid crystals between polymer thin film substrates having transparency and flexibility properties.

Further, the present invention has been made in an effort to provide a flexible liquid crystal Fresnel lens that may widely control a lens focal length by stacking a plurality of liquid crystal Fresnel lenses and then selectively activating the liquid crystal Fresnel lens of each layer.

An exemplary embodiment of the present invention provides a flexible liquid crystal Fresnel lens including a liquid crystal layer disposed between an upper substrate and a lower substrate in which a Fresnel region pattern is disposed, wherein the lower substrate and the upper substrate may respectively include a first substrate and a second substrate including a transparent and flexible material while having a birefringent index, optical axes of the lower substrate and the upper substrate are perpendicular to each other, and optical axes respectively forming an angle of 45° with respect to the lower substrate and the upper substrate are formed in the liquid crystal layer.

The liquid crystal layer may include a spacer disposed at an edge of an inner circumferential surface between the lower substrate and the upper substrate, and liquid crystals filled in a liquid crystal space formed by the lower substrate, the upper substrate, and the spacer, and the spacer may be formed with a double-sided adhesive tape having a thickness corresponding to a height of the liquid crystal layer.

The liquid crystal layer may include a spacer disposed at an edge of an inner circumferential surface between the lower substrate and the upper substrate, and liquid crystals filled in a liquid crystal space formed by the lower substrate, the upper substrate, and the spacer, and the spacer may be formed by coating a double-sided adhesive material on opposite sides of a film having a predetermined thickness.

Incident light may proceed in an extraordinary direction or in an ordinary direction by the lower substrate, the light of the extraordinary or ordinary direction applied from the lower substrate may be divided and proceeded in the extraordinary direction and the ordinary direction by the liquid crystal layer, and the liquid crystal light of the extraordinary and ordinary directions applied from the liquid crystal layer may be divided and outputted in the extraordinary direction and the ordinary direction by the upper substrate.

The lower substrate may have a structure in which a first transparent electrode provided with electrodes formed to correspond to the first substrate and the Fresnel region pattern, an insulation layer, a metal line electrically connected to the first transparent electrode, and a first alignment layer are sequentially stacked, the upper substrate may have a structure in which a second alignment layer, a second transparent electrode provided with a common electrode, and the second substrate are sequentially stacked, and the first alignment layer of the lower substrate may be rubbed in a predetermined direction, while the second alignment layer of the upper substrate may be rubbed to be antiparallel to the rubbing direction of the first alignment layer, such that a liquid crystal alignment direction of the liquid crystal layer disposed between the lower and upper substrate may be induced in a direction of 45° with each of the optical axes of the lower substrate and the upper substrate, which are orthogonal to each other.

The insulation layer may be flexible.

The first transparent electrode of the lower substrate may be configured to form at least one Fresnel region pattern.

A focal length of the lens may vary depending on a voltage level applied to the Fresnel region pattern.

The focal length of the lens may be changed by changing a curvature radius of the lens to change the Fresnel region pattern.

The flexible liquid crystal Fresnel lens may have a structure in which two or more flexible liquid crystal Fresnel lenses are stacked, and the focal length thereof may be varied by selectively activating at least one of the stacked flexible liquid crystal Fresnel lenses.

The flexible liquid crystal Fresnel lens may be applied to an optical display such as a flat or curved optical lens or a virtual reality device.

The flexible liquid crystal Fresnel lens may further include a substrate that is attached to at least one of the first substrate and the second substrate and has optical isotropy.

The Fresnel region pattern may include a first Fresnel region pattern and a second Fresnel region pattern, the second Fresnel region pattern is stacked on the first Fresnel region pattern, and the first Fresnel region pattern and the second Fresnel region pattern may be arranged differently from each other.

According to the embodiment of the present invention, by realizing a liquid crystal Fresnel lens using a transparent and flexible polymer substrate while having a birefringent index, it is possible to manufacture a lens independent of polarization with a single element, thereby reducing a thickness of the lens by several tens to several hundreds of micrometers, thus it is possible to provide an ultra-thin, ultra-light liquid crystal Fresnel lens.

According to the embodiment of the present invention, a flexible liquid crystal Fresnel lens having a flexible and bendable characteristic may be easily attached to and used for a display surface of a lens having a curved surface, for example, a display surface of spectacles or a virtual reality device. Particularly, according to the embodiment of the present invention, since a liquid crystal Fresnel lens is realized by using a substrate made of a polymer material, the liquid crystal Fresnel lenses may be easily deposited to each other during stacking compared to a liquid crystal Fresnel lens realized with a conventional glass substrate, thus when the liquid crystal Fresnel lens is integrated to a general optical lens, an optical display, or the like, it may be compactly combined thereto without any additional configuration.

In addition, according to the embodiment of the present invention, by stacking ultra-thin flexible liquid crystal Fresnel lenses, it is possible to increase lens power without increasing an area of a lens, thereby widely ensuring a variable focal range in a cross-sectional area thereof.

DETAILED DESCRIPTION OF THE EMBODIMENTS

Figure 1:
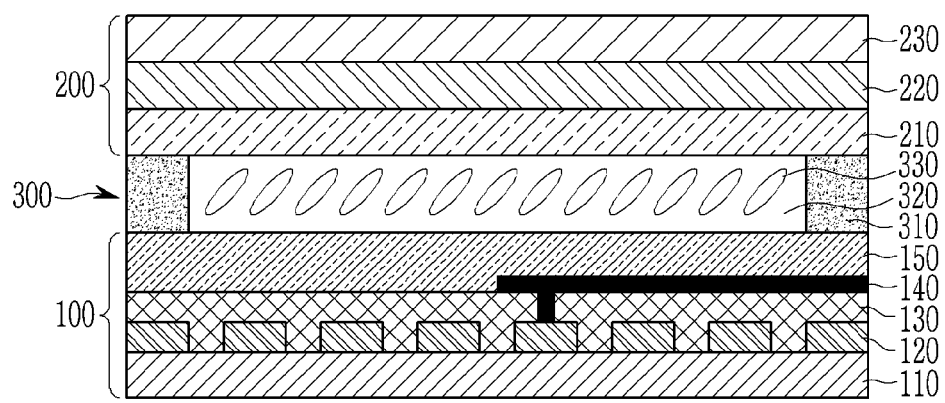
FIG. 1 illustrates a schematic view of a flexible liquid crystal Fresnel lens according to an exemplary embodiment of the present invention.

Hereinafter, the present invention will be described more fully with reference to the accompanying drawings. It is to be noted that the same elements among the accompanying drawings are denoted by the same reference numerals throughout the specification. Prior to providing the description, it is to be understood that the terms or words used in the specification and claims of the present invention are not to be interpreted only using typical or limited dictionary meanings, and are constructed as having meanings and concepts conforming to the technical spirit of the present invention based on the principle that the inventors can appropriately define the concepts of the terms to explain the present invention in the best manner. Accordingly, it is to be understood that the detailed description, which will be disclosed along with the accompanying drawings, is intended to describe the exemplary embodiments of the present invention and is not intended to represent all technical ideas of the present invention. Therefore, it should be understood that various equivalents and modifications can exist which can replace the embodiments described at the time of the application.

FIG. 1 illustrates a schematic view of a flexible liquid crystal Fresnel lens according to a first exemplary embodiment of the present invention.

As shown in FIG. 1, a flexible liquid crystal Fresnel lens according to an exemplary embodiment of the present invention includes a lower substrate 100, an upper substrate 200, and a liquid crystal layer 300 positioned between the lower substrate 100 and the upper substrate 200.

In this case, the lower substrate 100 and the upper substrate 200 are formed with a transparent and flexible substrate having a birefringent index, and an optical axis of the lower substrate 100 and an optical axis of the upper substrate 200 are disposed to be orthogonal to each other.

In addition, the lower substrate 100 and the upper substrate 200 include a transparent and flexible material. Thus, the liquid crystal Fresnel lens according to the exemplary embodiment of the present invention has flexibility according to the material.

Figure 2:
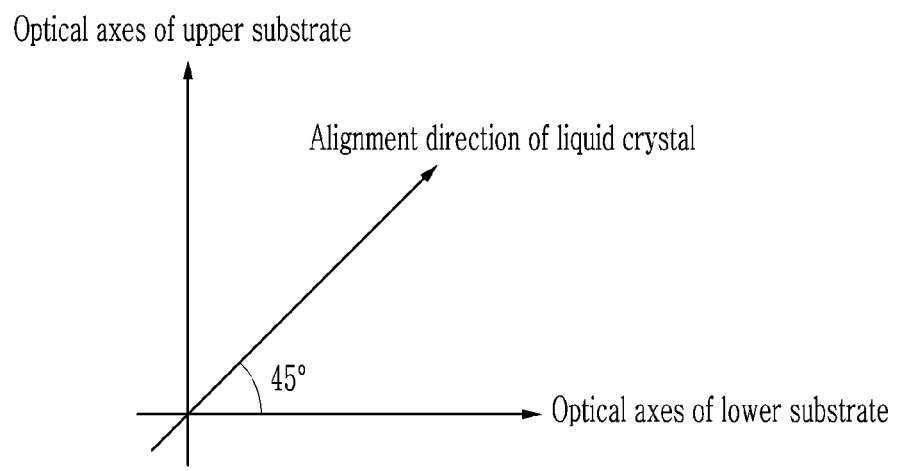
FIG. 2 illustrates an alignment angle of an optical axis of a liquid crystal layer 300 shown in FIG. 1.

The liquid crystal layer 300 is formed by injecting liquid crystals into a predetermined space between the lower substrate 100 and the upper substrate 200. In this case, an alignment direction of the liquid crystals, that is, an optical axis of the liquid crystal layer 300, as shown in FIG. 2, is disposed at an angle of 45° with each of the optical axes of the lower substrate 100 and the upper substrate 200, which are orthogonal to each other.

Figure 3:
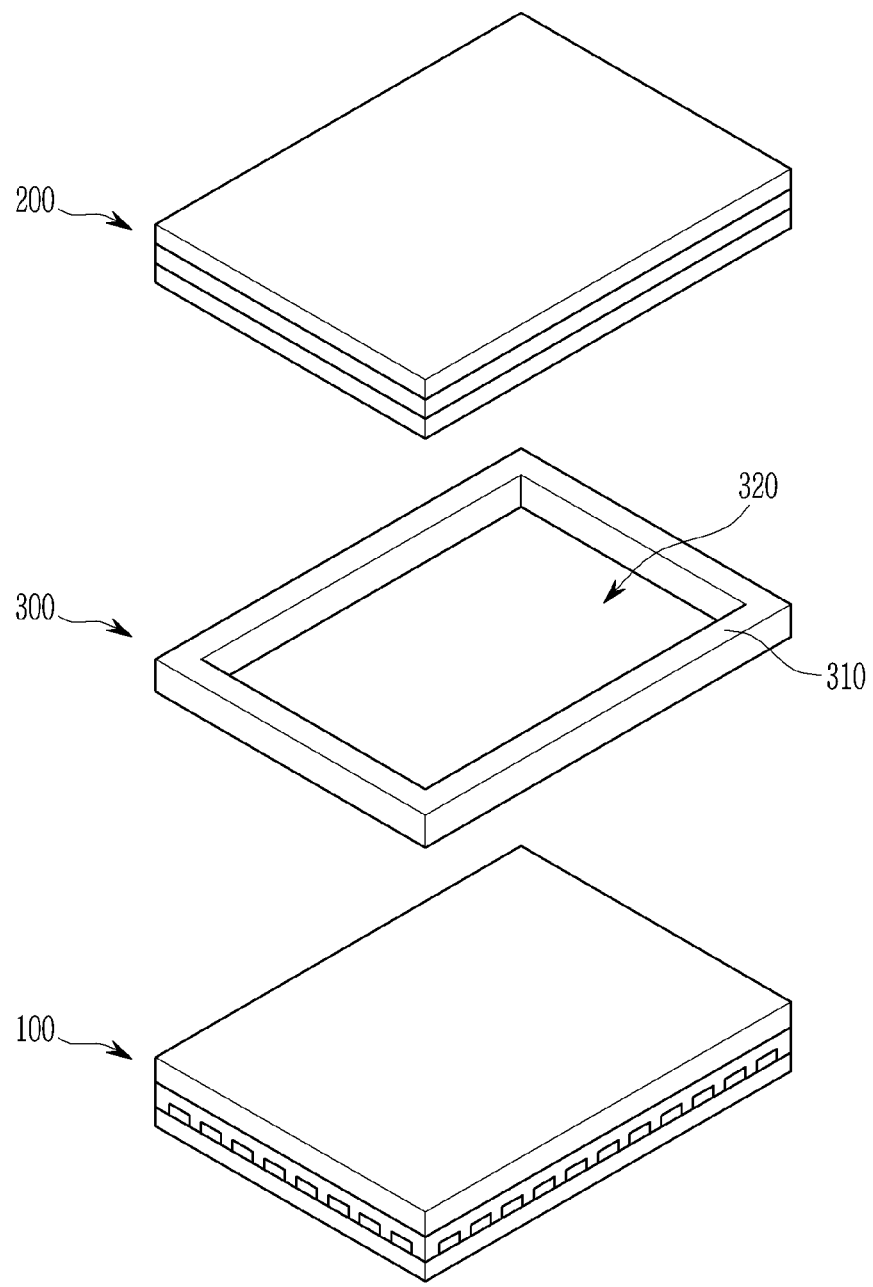
FIG. 3 illustrates a schematic view of the liquid crystal layer 300 shown in FIG. 1.

As shown in FIG. 3, the liquid crystal layer 300 includes a spacer 310 disposed at an edge of an inner circumferential surface between the lower substrate 100 and the upper substrate 200, and liquid crystals 330 filled in a liquid crystal space 320 formed by the lower substrate 100, the upper substrate 200, and the spacer 310.

The spacer 310 may be formed with a double-sided adhesive tape having a thickness corresponding to a height of the liquid crystal layer 300.

Figure 4:
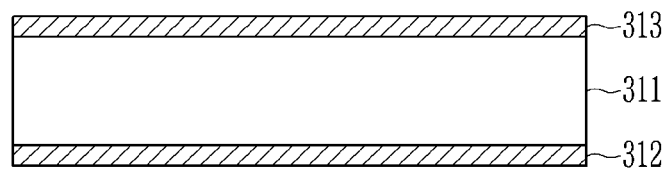
FIG. 4 illustrates an exemplary shape of a spacer 310 shown in FIG. 3.

Alternatively, as shown in FIG. 4, the spacer 310 may be formed by coating first and second double-sided adhesive materials 312 and 313 on opposite sides (which are upper and lower sides) of a flexible material 311 having a predetermined thickness. For example, the spacer 310 may be realized with a polymer film coated with an adhesive material on opposite sides thereof. Here, the first and second double-sided adhesive materials 312 and 313 may be made of various types of adhesive materials including a double-sided adhesive tape.

As shown in FIG. 1, the lower substrate 100 may have a structure in which a first substrate 110, a first transparent electrode 120, an insulation layer 130, a metal line 140, and a first alignment layer 150 are sequentially stacked.

The first substrate 110 may be made of a transparent and flexible polymer thin film or ceramic substrate having a birefringent index. For example, the first substrate 110 may be made of polyethylene terephthalate (PET), polyethylene naphthalate (PEN), polycarbonate (PC), or polyethersulfone (PES), which is a birefringent film. In addition, the first substrate 110 may be made of a transparent birefringent material such as quartz.

Figure 11:
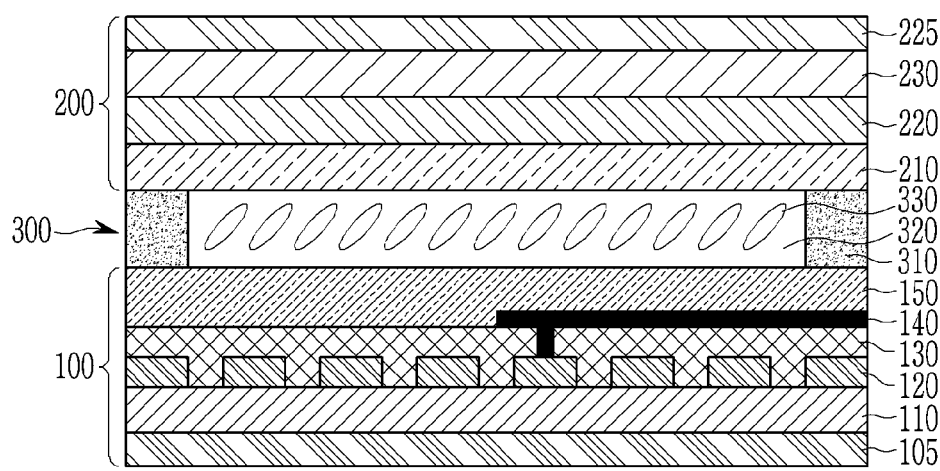
FIG. 11 illustrates a schematic view of a flexible liquid crystal Fresnel lens according to another exemplary embodiment of the present invention.

Further, the first substrate 110 may have a structure in which the transparent birefringent material described above is attached to a substrate having optical isotropy such as glass. The exemplary embodiment is shown in FIG. 11, and referring to FIG. 11, the flexible liquid crystal Fresnel lens described above with reference to FIG. 1 may be realized by attaching the first substrate 110 described above to a substrate 105 having optical isotropy such as glass.

The first transparent electrode 120 is disposed on an upper surface of the first substrate 110, and includes transparent electrodes patterned as independently controllable Fresnel regions. In this case, the Fresnel region may be formed in various patterns, for example, a circular pattern having an increasing radius (P in FIG. 8 and FIG. 9) and the like. In the present exemplary embodiment, a Fresnel region pattern having a power of 1 diopter for light of a 543 nm wavelength may be formed of indium tin oxide (ITO) with a thickness of 127 μm. In addition, each Fresnel region may include a plurality of sub-regions. The Fresnel region pattern may be made of a transparent organic material or graphene as a transparent conductor in addition to ITO.

An electric field is applied between a second transparent electrode 220 corresponding to a common electrode to be described later and a Fresnel region pattern having a plurality of sub-regions to change a direction of the liquid crystals, thereby obtaining different refractive indexes in the respective sub-regions.

The insulation layer 130 is made of a flexible and transparent material to separate electrodes of the first transparent electrode 120. In this case, a plurality of metal lines 140 for applying an electric field to each of the patterned first transparent electrodes 120 are disposed on an upper surface of the insulation layer 130. The metal line 140 may be formed to have a single-layered or multi-layered structure including Al, Au, Pt, Ni, Ti, and Cu with a thickness of about 550 nm. In a case of the multi-layered metal line 140, a lower layer thereof in contact with the insulation layer 130 is preferably made of a metal having a high adhesion coefficient with respect to the insulation layer 130, and an upper layer thereof disposed on the lower layer is preferably made of a metal having high electrical conductivity. Here, the metal line 140 and the first transparent electrode 120 are electrically connected through a via-hole (vertical hole or specific path) (which is not shown) in the insulation layer 130. The insulation layer 130 may serve to isolate and separate the first transparent electrode 120 from the metal line 140 except for a portion electrically connected through the via-hole.

In the present exemplary embodiment, the insulation layer 130 may be made of SU-8 at about a 500 nm thickness to form a flexible layer. The insulation layer 130 may be made of other materials such as silicon dioxide ($SiO_2$) other than SU-8.

The first alignment layer 150 is disposed on the upper surface of the insulation layer 130. The first alignment layer 150 is rubbed in a single direction to separate the metal lines 140 disposed on the upper surface of the insulation layer 130. In the present exemplary embodiment, the first alignment layer 150 may be made of polyvinyl alcohol or polyimide at a 50 nm thickness. A rubbing direction of the first alignment layer 150 may determine an optical axis of the liquid crystal 330.

The liquid crystal layer 300 is disposed on an upper surface of the first alignment layer 150 of the lower substrate 100. The liquid crystal layer 300 may include nematic liquid crystals, and a thickness of the liquid crystal layer 300 may be determined by a thickness of the spacer 310 positioned at the edge of the lens.

The upper substrate 200 is disposed on an upper surface of the liquid crystal layer 300, and the upper substrate 200 may have a structure in which a second alignment layer 210, the second transparent electrode 220, and a second substrate 230 are sequentially stacked.

The second alignment layer 210 may be formed by rubbing in a direction that is antiparallel to a rubbing direction of the first alignment layer 140 of the lower substrate 100.

The second transparent electrode 220 is a common electrode layer. The second transparent electrode 220 may be made of ITO at about a 127 nm thickness. The second transparent electrode 220 may be made of a transparent organic material or graphene as a transparent conductor in addition to ITO.

The second substrate 230 may be formed with a transparent and flexible polymer thin film or a ceramic substrate having a birefringent index as the first substrate 110. For example, the second substrate 230 may be made of polyethylene terephthalate (PET), polyethylene naphthalate (PEN), polycarbonate (PC), or polyethersulfone (PES), which is a birefringent film. In addition, the second substrate 230 may be made of a transparent birefringent material such as quartz.

Further, the second substrate 230 may have a structure in which the transparent birefringent material described above is attached to a substrate having optical isotropy such as glass. The exemplary embodiment is shown in FIG. 11, and referring to FIG. 11, the flexible liquid crystal Fresnel lens described above with reference to FIG. 1 may be realized by attaching the second substrate 230 described above to a substrate 225 having optical isotropy such as glass and positioning the second substrate 230 between the substrate 225 and the second transparent electrode 220.

As shown in FIG. 2, the second substrate 230 is disposed to have an optical axis that is orthogonal to an optical axis of the first substrate 110 of the lower substrate 100.

Hereinafter, an operation of the flexible liquid crystal Fresnel lens shown in FIG. 1 will be described with reference to Table 1.

Table 1 shows refractive indexes at respective light paths (the lower substrate 100, the liquid crystal layer 300, and the upper substrate 200) generated from the flexible liquid crystal Fresnel lens shown in FIG. 1. Specifically, when light polarized parallel to an optical axis of the lower substrate 100, that is, light is incident, Table 1 shows the refractive indexes in respective optical paths generated while passing through the flexible liquid crystal Fresnel lens. In this case, both the first substrate 110 and the second substrate 230 of the lower substrate 100 and the upper substrate 200 are made of a material having a birefringence index, and the material having the birefringence index has an ordinary refractive index and an extraordinary refractive index. Therefore, when light is incident on a birefringent material, the light is divided into an extraordinary ray having a polarization direction in a direction of a director (optical axis) of the birefringent material in the medium and an ordinary ray having a polarization direction in a direction perpendicular to the director to proceed. The ordinary ray and the extraordinary ray respectively proceed according to the ordinary refractive index and the extraordinary refractive index.

TABLE 1

| Polarization of incident light | Lower substrate 100 | Liquid crystal layer 300 | Upper substrate 200 |
|---|---|---|---|
| $\vec{S} = \begin{bmatrix} 1 \\ 0 \\ 0 \end{bmatrix}$ | $n_1^e$ $\vec{S}_e = \begin{bmatrix} 1 \\ 0 \\ 0 \end{bmatrix}$ | $\vec{S}_e = \begin{bmatrix} \frac{\sqrt{2}}{2} \\ \frac{\sqrt{2}}{2} \\ 0 \end{bmatrix}$ | $\vec{S}_e = \begin{bmatrix} 0 \\ 1 \\ 0 \end{bmatrix}$ |
| | | $n_{LC}^e(V)$ | $n_2^e$ $\vec{S}_o = \begin{bmatrix} 1 \\ 0 \\ 0 \end{bmatrix}$ $n_2^o$ |
| | $n_1^e$ | $\vec{S}_o = \begin{bmatrix} \frac{\sqrt{2}}{2} \\ -\frac{\sqrt{2}}{2} \\ 0 \end{bmatrix}$ | $\vec{S}_e = \begin{bmatrix} 0 \\ 1 \\ 0 \end{bmatrix}$ |
| | | $n_{LC}^o(V)$ | $n_2^e$ $\vec{S}_o = \begin{bmatrix} 1 \\ 0 \\ 0 \end{bmatrix}$ $n_2^o$ |

In Table 1, $\vec{S}$ is a unit vector of light, $\vec{S}_e$ is a unit vector of an extraordinary direction, $\vec{S}_o$ is a unit vector of an ordinary direction, $n_{LC}^e$ is a refractive index of an extraordinary direction of the liquid crystal layer 300, $n_{LC}^o$ is a refractive index of an ordinary direction of the liquid crystal layer 300, $n_1^e$ is a refractive index of an extraordinary direction of the lower substrate 100, $n_2^e$ is a refractive index of an extraordinary direction of the upper substrate 200, and $n_2^o$ is a refractive index of an ordinary direction of the upper substrate 200.

As shown in FIG. 2, light polarized in an x-axis direction is incident on the flexible liquid crystal Fresnel lens in a state in which the optical axis of the lower substrate 100 is parallel to an x-axis, the optical axis of the upper substrate 200 is parallel to a y-axis, and the optical axis of the liquid crystal layer 300 is at an angle of 45° with respect to each of the lower substrate 100 and the upper substrate 200.

When light is incident on the lower substrate 100 to be parallel to an optical axis having the extraordinary refractive index in the above-described state, the refractive index is the extraordinary refractive index of the lower substrate 100, and a polarization direction of light passing through the lower substrate 100 is the same as a polarization direction of the incident light. That is, as shown in Table 1, the polarization direction ($\vec{S}$) of the light incident to be parallel to the optical axis having the extraordinary refractive index is equal to the polarization direction of the light with respect to the extraordinary refractive index ($n_1^e$) of the lower substrate 100.

In addition, since the optical axis of the first substrate 110 and the optical axis of the liquid crystal 330 are at an angle of 45° from each other, the polarization direction of the light passing through the lower substrate 100 forms an angle of 45° with respect to the optical axis of the liquid crystal 330 having the extraordinary refractive index, and the light incident at this angle is divided into light having components of the extraordinary direction and the ordinary direction to proceed with different refractive indices. The light in the extraordinary direction of the liquid crystal 330 proceeds depending on change of the refractive index according to intensity of an electric field. That is, as shown in Table 1, the extraordinary direction light ($\vec{S}_e$) applied to the liquid crystal layer 300 from the lower substrate 100 proceeds in the extraordinary direction ($\vec{S}_e$) with respect to the extraordinary direction refractive index ($n_{LC}^e$), and proceeds in the ordinary direction ($\vec{S}_o$) with respect to the ordinary direction refractive index ($n_{LC}^o$). Accordingly, the light passing through the liquid crystal layer 300 is polarized and outputted in the extraordinary direction and the ordinary direction of the liquid crystal layer.

As such, the light incident on the liquid crystal 330 at 45° with respect to the optical axis of the liquid crystal 330 is subject to the change of the refractive index depending on the intensity of the electric field applied to the liquid crystal 330, and serves to guide the light to form an angle of 45° with respect to the optical axis of the liquid crystal 330. When the optical axis of the first substrate 110 and the optical axis of the liquid crystal 330 are parallel or perpendicular to each other, they are dependent on polarization, while in other cases, they have no polarization dependence, and when an angle between the two optical axes is 45°, the highest transmittance is provided.

The light of the ordinary and extraordinary directions passing through the liquid crystal layer 300 are incident on the second substrate 230 while forming an angle of 45° with respect to the optical axis of the second substrate 230. The light in the extraordinary direction passing through the liquid crystal layer 300 is incident at an angle of about 45° relative to the extraordinary direction and the ordinary direction of the upper substrate 200, and the light is divided into light in the extraordinary and ordinary directions of the upper substrate 200 to proceed with different refractive indices. In addition, as in the light in the extraordinary direction passing through the liquid crystal layer 300 described above, the light in the ordinary direction passing through the liquid crystal layer 300 is divided into light in the extraordinary and ordinary directions of the upper substrate 200 to proceed with different refractive indices. That is, as shown in Table 1, the light in the extraordinary direction passing through the liquid crystal layer 300 is outputted in the extraordinary direction light ($\vec{S}_e$) with respect to the extraordinary refractive index ($n_2^e$) and the ordinary direction light ($\vec{S}_o$) with respect to the ordinary refractive index ($n_2^o$) at the upper substrate 200, and the light in the ordinary direction passing through the liquid crystal layer 300 is also outputted in the extraordinary direction light ($\vec{S}_e$) with respect to the extraordinary refractive index ($n_2^e$) and the ordinary direction light ($\vec{S}_o$) with respect to the ordinary refractive index ($n_2^o$) at the upper substrate 200.

In Table 1, the case that the light is incident on the lower substrate 100 in the direction parallel to the optical axis of the lower substrate 100 has been described, but, in light incident perpendicularly to the optical axis of the lower substrate 100, a total refractive index subject to the flexible liquid crystal Fresnel lens is the same as that of the case in which the light is incident parallel to the optical axis of the lower substrate 100, according to the same principle, except the refractive index of the lower substrate which is $n_1^o$ instead of $n_1^e$.

Therefore, in the flexible Fresnel lens of the present invention, since the light passes through the lens in any direction always has voltage dependence refractive index change, the flexible Fresnel lens has a change of the refractive index according to a change of the intensity of the electric field irrespective of the polarization.

Figure 5:
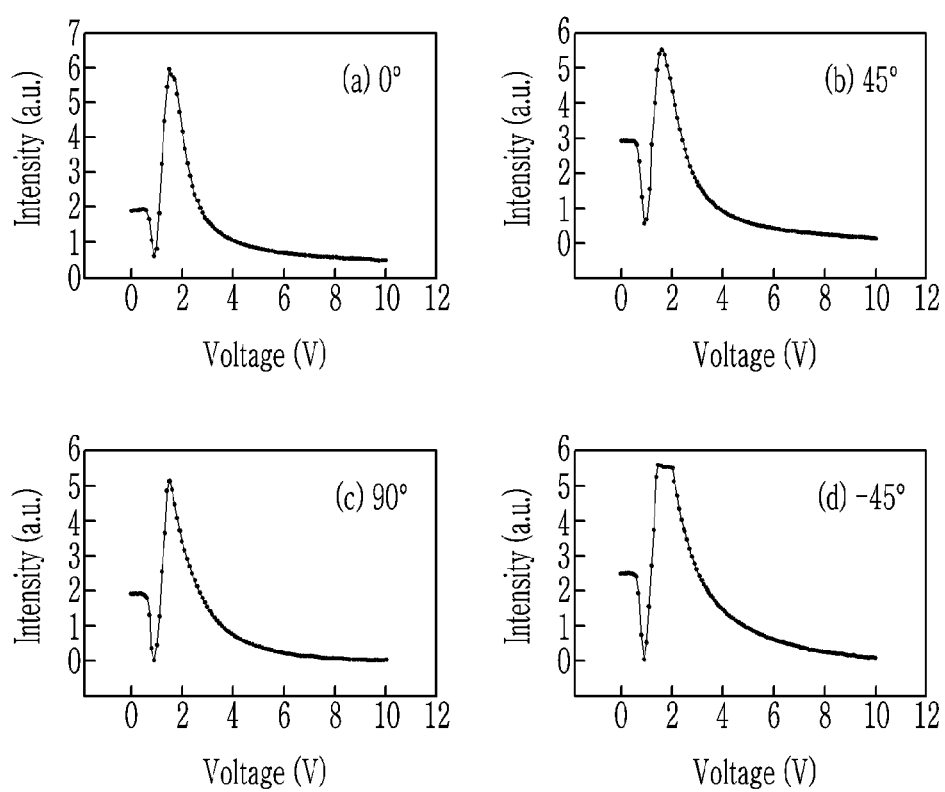
FIG. 5 illustrates a measurement result of light transmittance in a case in which polarized light of 0°, 45°, 90°, or −45° is incident on the flexible liquid crystal Fresnel lens shown in FIG. 1.

FIG. 5 illustrates measurement results of light transmittance when polarized light of 0°, 45°, 90°, and −45° with respect to the optical axis having the extraordinary refractive index is incident on the lower substrate of the flexible liquid crystal Fresnel lens according to the exemplary embodiment of the present invention, in which the light transmittance measured while changing the voltage applied to the first transparent electrode 120 deposited on the lower substrate 100 and the upper substrate 200 is illustrated. In order to obtain such results, the flexible liquid crystal Fresnel lens according to the exemplary embodiment of the present invention was placed between polarizers that are orthogonal to each other, and voltage-transmittance was measured while changing the angle of the optical axis of the lens. As shown in FIG. 5, it can be seen that the flexible liquid crystal Fresnel lens according to the exemplary embodiment of the present invention has similar electro-optical characteristic irrespective of polarization.

Figure 6:
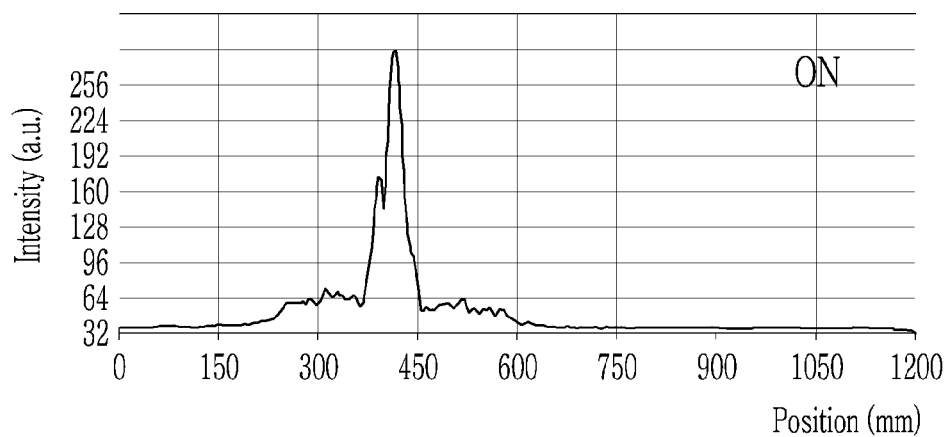
FIG. 6 illustrates an experimental result of a focal length in a case in which a flexible liquid crystal Fresnel lens shown in FIG. 1 is electrically turned on or off.
Figure 6:
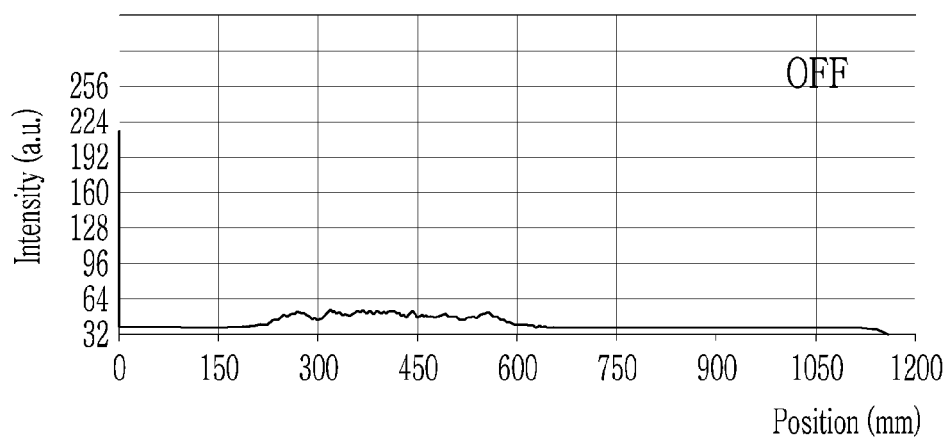

In addition, FIG. 6 illustrates focal lengths when the flexible liquid crystal Fresnel lens is electrically turned on or off, in which when the flexible liquid crystal Fresnel lens is in a turned-on state, intensity of light is high at a lens center point of about 400 mm. Accordingly, when the flexible liquid crystal Fresnel lens according to the exemplary embodiment of the present invention is in the turned-on state, it can be seen that light is focused on one point from an arbitrary focal length.

Figure 7:
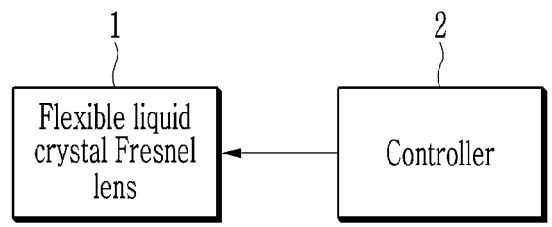
FIG. 7 illustrates a block diagram for schematically configuring a flexible liquid crystal Fresnel lens device shown in FIG. 1.

Accordingly, in the exemplary embodiment of the present invention, based on the characteristics of FIG. 5 and FIG. 6, it is possible to change the focal length by adjusting the electrode position of the first transparent electrode 120 configured of the Fresnel region pattern of the flexible liquid crystal Fresnel lens and the voltage level applied to the electrode. That is, as shown in FIG. 7, a flexible liquid crystal Fresnel lens device includes a flexible liquid crystal Fresnel lens 1 and a controller 2 that varies the focal length of the flexible liquid crystal Fresnel lens 1 by providing a predetermined level of voltage to a predetermined position electrode of the flexible liquid crystal Fresnel lens 1 to activate the Fresnel area pattern.

The controller 2 pre-stores information of an electrode position and a voltage level corresponding to a target focal length in a memory (not shown), and, based on the stored information, the controller 2 varies a focal length by providing a voltage corresponding to a desired focal length to a corresponding first transparent electrode 120 of the flexible liquid crystal Fresnel lens 1. Here, a technique of changing the focal length in accordance with the diffraction operation principle by applying a voltage to the liquid crystal to activate the Fresnel region pattern is well-known, so a detailed description thereof will be omitted.

In addition, the controller 2 may perform an eyeball tracking function of a user so as to vary a focal length of the flexible liquid crystal Fresnel lens 1 corresponding to a user's viewpoint. In this case, the controller 2 performs the eyeball tracking function according to an eyeball tracking algorithm based on a user's eyeball image provided through a camera (not shown).

Figure 8:
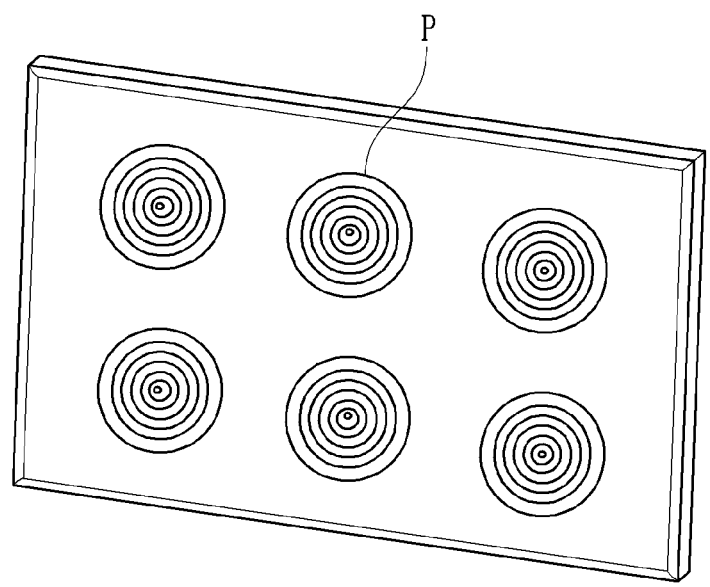
FIG. 8 to FIG. 10 illustrates various examples of a flexible liquid crystal Fresnel lens according to an exemplary embodiment of the present invention.

In addition, according to the exemplary embodiment of the present invention, as shown in FIG. 8, a flexible liquid crystal Fresnel lens in which a plurality of Fresnel region patterns P are formed may be realized. This may be realized by arranging the patterns of the first transparent electrode 120 of the lower substrate 100 in the form shown in FIG. 8.

That is, as described above, according to the exemplary embodiment of the present invention, the flexible liquid crystal Fresnel lens that provides the refractive index irrespective of polarization using one lens may be realized.

Further, the above-described flexible liquid crystal Fresnel lens may be applied to a flat or curved optical lens or display, or may be used by being attached to a front or rear surface of an optical lens or display of a conventional planar or curved surface with a fixed focal length. For example, by attaching it to a general spectacle lens having a fixed focal length to electrically vary a focal length, it is possible to automatically adjust the power for presbyopia, nearsightedness, and farsightedness.

Figure 9:
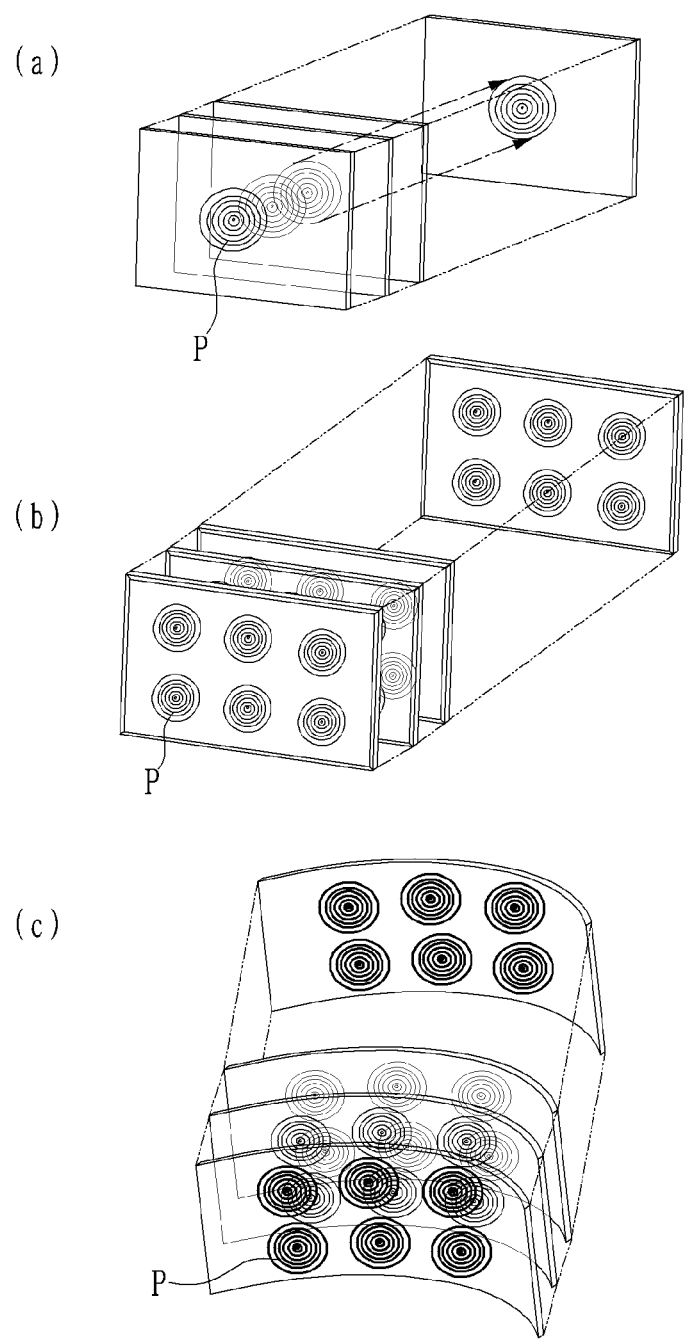

In addition, in the exemplary embodiment of the present invention, it is possible to stack a plurality of flexible liquid crystal Fresnel lenses having the above-described configuration as shown in FIG. 9 to realize one stacked flexible liquid crystal Fresnel lens. Since the flexible liquid crystal Fresnel lens according to the exemplary embodiment of the present invention is formed with first and second ultra-thin substrates having a predetermined thickness or less, a thickness thereof is considerably thinner than that of a conventional lens which is manufactured using two sheets of glass substrates having a predetermined thickness or more, and since the flexible liquid crystal Fresnel lens according to the exemplary embodiment of the present invention is formed of a polymer material, it is easier to be deposited to each other during stacking than a liquid crystal Fresnel lens realized with conventional glass substrates, thereby ensuring sufficient usability.

For example, since the flexible liquid crystal Fresnel lens according to the exemplary embodiment of the present invention is formed with a thin substrate of several 100 μm, as shown in FIG. 9 (a), it is possible to realize a lens having a very short focal length, that is, high lens power, by stacking a plurality of flexible liquid crystal Fresnel lenses. In this case, it is possible to widely vary a focal length without widening a lens area as compared with the single flexible liquid crystal Fresnel lens by electrically activating a predetermined number of flexible liquid crystal Fresnel lenses corresponding to a focal length.

In addition, as shown in FIG. 9 (b) or (c), it is possible to further widely vary a focal length according to a wide viewing angle by stacking lenses provided with a plurality of Fresnel area patterns to apply them to a flat or curved optical lens or display or to attach them to a conventional optical lens or display.

For example, the stacked flexible liquid crystal Fresnel lens shown in FIG. 9 (b) or (c) may be applied to a virtual reality device or the like. In this case, although not shown, a typical virtual reality device mainly includes a display unit and an optical unit, and the optical unit includes an optical lens having power of about +9 diopters. However, in reality, when 3D images are displayed by a virtual reality device, it has been reported that a wearer thereof experiences headaches and vomiting. This is because a focal length and vergence of the wearer's eyes are constantly fixed regardless of far and near conditions of objects being viewed in a state in which far and near objects that are being continuously changed are displayed to the wearer, that is, because of a vergence-accommodation conflict. Therefore, according to the exemplary embodiment of the present invention, by stacking lenses provided with a plurality of Fresnel area patterns such that may be disposed inside the display unit of the virtual reality device and changing and setting the number and the positions of active layers of the lens corresponding to the far and near state of the object viewed by the display unit of the virtual reality device, it is possible to solve the above-mentioned conventional vergence-accommodation conflict by changing the focal length according to the far and near state of the object. As described above, the stacked flexible liquid crystal Fresnel lens in which the plurality of Fresnel area patterns are stacked may be applied to various types of head-up display devices including the virtual reality device.

Figure 10:
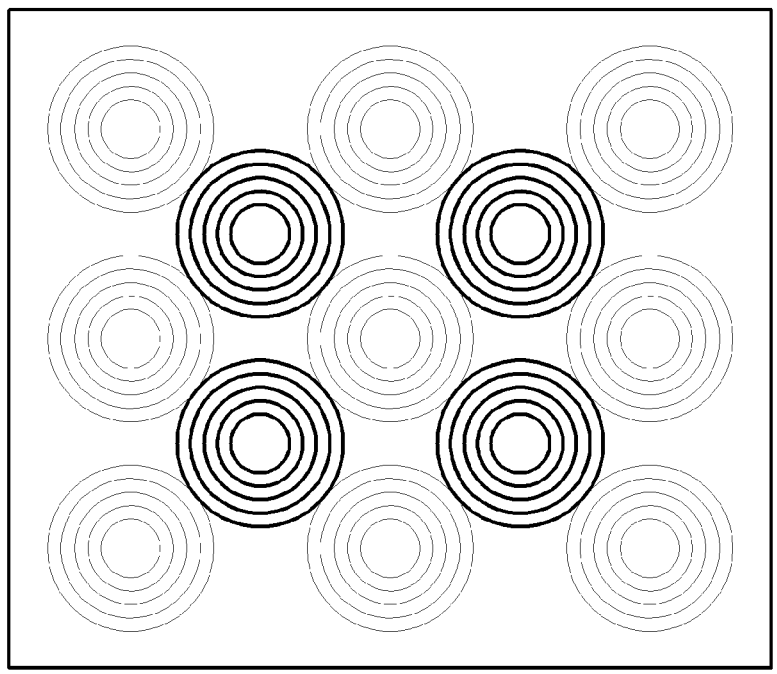

Referring to FIG. 10, by stacking the unit lenses of the respective layers in different arranging methods, the area occupied by the liquid crystal lens in an area within a range of view may be maximized to obtain an effect of varying the focal length in a wide range of view. In FIG. 10, substrates including a liquid crystal lens array (first Fresnel zone pattern) that is shown relatively thin and substrates including a liquid crystal lens array (second Fresnel zone pattern) that is shown relatively thick are stacked, thus it is possible to selectively activate them according to a viewing direction to be able to vary the focal length in the wide area within the range of view. An exemplary variation in which the first Fresnel area pattern and the second Fresnel area pattern are positioned on the same substrate and an insulation layer is disposed between the first Fresnel area pattern and the second Fresnel area pattern may be realized.

According to the exemplary embodiment of the present invention, since the liquid crystal Fresnel lens is flexible, it is also possible to change the focal length of the lens by a predetermined range by physically varying a curvature radius thereof to change the Fresnel area pattern.

<Description of symbols>

| | |
|---|---|
| 100: lower substrate | 110: first substrate |
| 120: first transparent electrode | 130: insulation layer |
| 140: metal line | 150: first alignment layer |
| 200: upper substrate | 210: second alignment layer |
| 220: second transparent electrode | 230: second substrate |
| 300: liquid crystal layer | 310: spacer |
| 320: liquid crystal space | 330: liquid crystal |

What is claimed is:

1. A flexible liquid crystal Fresnel lens comprising
an upper substrate;
a lower substrate; and
a liquid crystal layer disposed between the upper substrate and the lower substrate,
wherein the lower substrate comprises a first substrate including a transparent and flexible material while having a birefringent index and a first transparent electrode provided with electrodes to form a Fresnel region pattern between the first substrate and the liquid crystal layer,
the upper substrate comprises a second substrate including a transparent and flexible material while having a birefringent index and a second transparent electrode provided with a common electrode between the liquid crystal layer and the second substrate,
an optical axis of the lower substrate and an optical axis of the upper substrate are perpendicular to each other,
the liquid crystal layer has optical axes respectively forming an angle of 45° with respect to the optical axis of the lower substrate and the optical axis of the upper substrate,
wherein the lower substrate has a structure in which the first substrate, the first transparent electrode, which is provided with electrodes to correspond to the Fresnel region pattern, an insulation layer, a metal line electrically connected to the first transparent electrode, and a first alignment layer are sequentially stacked, and the upper substrate has a structure in which a second alignment layer, the second transparent electrode, and the second substrate are sequentially stacked, the liquid crystal layer comprises a spacer disposed at an edge of an inner circumferential surface between the lower substrate and the upper substrate, and liquid crystals filled in a liquid crystal space formed by the lower substrate, the upper substrate, and the spacer, and wherein the electrodes to form the Fresnel region pattern correspond to one common electrode within the spacer.

2. The flexible liquid crystal Fresnel lens of claim 1, wherein the spacer is formed with a double-sided adhesive tape having a thickness corresponding to a height of the liquid crystal layer.

3. The flexible liquid crystal Fresnel lens of claim 1, wherein the liquid crystal layer comprises a spacer disposed at an edge of an inner circumferential surface between the lower substrate and the upper substrate, and liquid crystals filled in a liquid crystal space formed by the lower substrate, the upper substrate, and the spacer, and the spacer is formed by coating a double-sided adhesive material on opposite sides of a film having a predetermined thickness.

4. The flexible liquid crystal Fresnel lens of claim 1, wherein incident light proceeds in an extraordinary direction or in an ordinary direction by the lower substrate, the light of the extraordinary or ordinary direction applied from the lower substrate is divided and proceeded in the extraordinary direction and the ordinary direction by the liquid crystal layer, and the liquid crystal light of the extraordinary and ordinary directions applied from the liquid crystal layer is divided and outputted in the extraordinary direction and the ordinary direction by the upper substrate.

5. The flexible liquid crystal Fresnel lens of claim 1, wherein the first alignment layer of the lower substrate is rubbed in a predetermined direction, while the second alignment layer of the upper substrate is rubbed to be antiparallel to the rubbing direction of the first alignment layer, such that a liquid crystal alignment direction of the liquid crystal layer disposed between the first alignment layer and the second alignment layer is induced in a direction of 45° with each of the optical axes of the lower and the upper substrate.

6. The flexible liquid crystal Fresnel lens of claim 5, wherein the insulation layer is flexible.

7. The flexible liquid crystal Fresnel lens of claim 5, wherein the first transparent electrode of the lower substrate is configured to form at least one Fresnel region pattern.

8. The flexible liquid crystal Fresnel lens of claim 1, wherein a focal length of the lens varies depending on a voltage level applied to the Fresnel region pattern.

9. The flexible liquid crystal Fresnel lens of claim 1, wherein the focal length of the lens is changed by changing a curvature radius of the lens to change the Fresnel region pattern.

10. The flexible liquid crystal Fresnel lens of claim 1, wherein the flexible liquid crystal Fresnel lens has a structure in which two or more flexible liquid crystal Fresnel lenses are stacked, and the focal length thereof is varied by selectively activating at least one of the stacked flexible liquid crystal Fresnel lenses.

11. The flexible liquid crystal Fresnel lens of claim 1, wherein the flexible liquid crystal Fresnel lens is applied to an optical display such as a flat or curved optical lens or a virtual reality device.

12. The flexible liquid crystal Fresnel lens of claim 1, further comprising a substrate that is attached to at least one of the first substrate and the second substrate and has optical isotropy.

13. The flexible liquid crystal Fresnel lens of claim 1, wherein the Fresnel region pattern comprises a first Fresnel region pattern and a second Fresnel region pattern, the second Fresnel region pattern is stacked on the first Fresnel region pattern, and the first Fresnel region pattern and the second Fresnel region pattern are arranged differently from each other.

14. The flexible liquid crystal Fresnel lens of claim 5, wherein a focal length of the lens varies depending on a voltage level applied to the Fresnel region pattern.

15. The flexible liquid crystal Fresnel lens of claim 7, wherein a focal length of the lens varies depending on a voltage level applied to the Fresnel region pattern.

16. The flexible liquid crystal Fresnel lens of claim 7, wherein the flexible liquid crystal Fresnel lens has a structure in which two or more flexible liquid crystal Fresnel lenses are stacked, and the focal length thereof is varied by selectively activating at least one of the stacked flexible liquid crystal Fresnel lenses.

* * * * *